(No Model.)
E. WALKER & J. SHAW.
PIPE FOR THE CONVEYANCE OF LIQUIDS OR GASES.
No. 483,274. Patented Sept. 27, 1892.
FIG_1_ 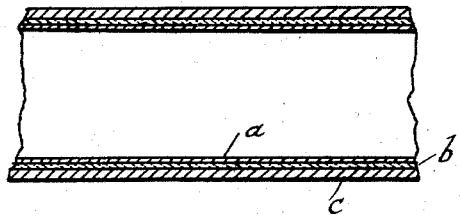  FIG_2_ 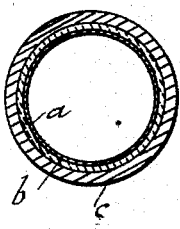
Witnesses
Inventors.
E. Walker, and
J. Shaw.
By their Attorney
Herbert W. T. Jenner.

UNITED STATES PATENT OFFICE.

EDWIN WALKER AND JOSEPH SHAW, OF HECKMONDWIKE, ENGLAND.

PIPE FOR THE CONVEYANCE OF LIQUIDS OR GASES.

SPECIFICATION forming part of Letters Patent No. 483,274, dated September 27, 1892.

Application filed May 16, 1892. Serial No. 433,254. (No model.)

*To all whom it may concern:*

Be it known that we, EDWIN WALKER and JOSEPH SHAW, citizens of Great Britain, residing at Heckmondwike, England, Kingdom of Great Britain, have invented certain new and useful Improvements in Pipes for the Conveyance of Liquids or Gases; and we do hereby declare the following to be a full, clear, and exact description of the invention, such as will enable others skilled in the art to which it appertains to make and use the same.

Our invention refers to pipes or tubes for conducting water or other liquids.

In the drawings, Figure 1 is a longitudinal section, and Fig. 2 is a cross-section, through a tube constructed according to this invention.

It is generally understood and admitted that water in the act of freezing expands about one-eleventh of its bulk, this irresistible natural law causing great damage and inconvenience by the bursting of the lead and iron pipes now in use. Our invention is intended to obviate this evil by the manufacture of compound tubes or pipes made in such a manner or form as will allow for the expansion of the water during the action of freezing without risk of bursting the pipe or tube.

In making our improved pipe or tube we first make what is called a "core-pipe." This we make of any of the most ductile metals, such as lead, tin, or copper or any of their compounds or alloys or of any other suitable material, the bore of this core-tube being about the bore of the pipe when finished. Onto this core-pipe we fix a coating or covering of any suitable elastic substance, such as rubber or any of its compounds, suiting the strength or thickness of this coating to the size of core-pipe, because, as will be evident, the smaller the bore of the pipe the less the water will expand, and the wider the bore the greater will be the expansion, and as this elastic coating is intended to receive the pressure of the core-pipe when the same is being expanded by the action of the water during the process of freezing and to return the same into its original position on the subsidence of the water or other liquid contained therein to its ordinary dimensions we adapt the thickness or strength according to the expansion. After fixing this coating on the core-pipe we now pass the same inside or through an outer tube or pipe, which may be made of iron or steel, and in order to fasten the core fast inside the iron or steel outer pipe we slightly expand the inner pipe or core-pipe by passing therethrough steel mandrels or other simple method of expansion, so that the inner and outer tubes are fixed firmly together in such a manner that the same can be cut or screwed like any other tube and coupled together in lengths with ordinary flanges or other couplings.

The object of the above arrangement is to provide an expanding and contracting tube inside an outer rigid tube, practically resulting in an unburstable tube or pipe, as the ductility of the inner tube or core-pipe allows the same to expand or contract as the water or other liquid expands or contracts by the action of frost and thaw without any danger to the outer pipe.

In the accompanying drawings, *a* represents the inner pipe or core; *b*, the expanding and contracting pipe, made of india-rubber or other suitable material, and *c* the outer pipe, composed of iron or steel.

We claim as our invention—

1. A compound pipe consisting of an inner core-pipe of ductile material, an external pipe of rigid material, and an elastic cushion interposed between the said two pipes and adapted to permit the core-pipe to expand when the liquid inside it freezes and to cause the said core-pipe to contract when the liquid thaws.

2. A compound pipe consisting of an inner core-pipe of ductile material, an external pipe of rigid metal, and a tubular cushion of india-rubber interposed between the said two pipes, substantially as and for the purpose set forth.

In testimony whereof we affix our signatures in presence of two witnesses.

EDWIN WALKER.
     JOSEPH SHAW.

Witnesses:
 ARTHUR B. CROSSLEY,
 THOMAS H. BARRON,
  *Both of Market Place, Huddersfield.*